US012756168B2

(12) United States Patent
Thomas et al.

(10) Patent No.: US 12,756,168 B2
(45) Date of Patent: Oct. 6, 2026

(54) OLD WORK BOX WITH BREAKAWAY WINGS

(71) Applicant: ABB Schweiz AG, Baden (CH)

(72) Inventors: Mathew Thomas, Collierville, TN (US); Blake Bartlett, Millington, TN (US); Keith Lang, White House, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/767,479

(22) Filed: Jul. 9, 2024

(65) Prior Publication Data

US 2026/0018874 A1 Jan. 15, 2026

(51) Int. Cl.
*H02G 3/12* (2006.01)

(52) U.S. Cl.
CPC .................................. *H02G 3/123* (2013.01)

(58) Field of Classification Search
CPC .............................. H02G 3/123; H02G 3/081
USPC .................................... 220/3.2, 3.3, 3.5–3.7
See application file for complete search history.

(56) References Cited

U.S. PATENT DOCUMENTS 4,063,660 A 12/1977 Ware
4,297,525 A 10/1981 Bowden, Jr.
5,434,359 A * 7/1995 Schnell .................... H02G 3/18 220/3.6
6,102,360 A * 8/2000 Clegg ...................... H02G 3/14 220/3.6
6,170,685 B1 * 1/2001 Currier .................. H02G 3/121 220/6
6,194,657 B1 * 2/2001 Gretz ..................... H02G 3/123 174/53
8,049,107 B2 * 11/2011 Dinh ........................ H02G 3/14 174/53
8,292,105 B1 * 10/2012 Gretz ..................... H02G 3/123 220/3.7
2006/0108362 A1 * 5/2006 Lalancette ............. H02G 3/126 220/3.7
2007/0194180 A1 8/2007 Korcz
2008/0264667 A1 * 10/2008 Dinh ...................... H02G 3/185 174/53
2019/0109445 A1 * 4/2019 Leese ..................... H02G 3/085

FOREIGN PATENT DOCUMENTS

EP 1722472 A2 * 11/2006 ............ H02G 3/123

OTHER PUBLICATIONS

ABB, "B120R 20 Cu in Old Work Box," product brochure, 2 pp. (Jul. 22, 2024).
U.S. Appl. No. 18/304,151, filed Apr. 20, 2023, Pending.

* cited by examiner

*Primary Examiner* — Rafael A Ortiz
(74) *Attorney, Agent, or Firm* — Fitch Even Tabin & Flannery LLP

(57) ABSTRACT

An old work box for installation in a wall includes: a partition having a partition outer surface and a partition inner surface; a backing wall attached to the partition, the backing wall and the partition forming a work box cavity; at least one flange disposed on the partition; a first wing movably disposed on the partition; and a first runner connecting the first wing to the partition outer surface and that breaks upon movement of the first wing.

16 Claims, 16 Drawing Sheets

OLD WORK BOX WITH BREAKAWAY WINGS

FIELD

The present application generally relates to old work boxes for housing electrical connections and/or components, such as electrical wires and outlets.

BACKGROUND

In general, a work box, also known as an electrical junction box, is an enclosure that houses electrical connections and/or components. Housing such connections and/or components in a work box protects not only the connections and/or components themselves, but also people who may come into proximity with the connections and/or components. A new work box is installed during the construction of a wall or a ceiling. In contrast, an old work box is installed in an existing wall or ceiling, after construction (e.g., during a renovation).

Existing old work boxes that are made of a non-metallic material, such as plastic, are typically injection molded. However, since such work boxes include multiple parts, each part has to be separately injection molded, then the collection of parts assembled into a finished product. Such assembly is time consuming and labor intensive. There is therefore a need to improve upon existing old work boxes.

SUMMARY

In an embodiment, the present invention provides an old work box for installation in a wall, comprising: a partition having a partition outer surface and a partition inner surface; a backing wall attached to the partition, the backing wall and the partition forming a work box cavity; at least one flange disposed on the partition; a first wing movably disposed on the partition; and a first runner connecting the first wing to the partition outer surface, the first runner being configured to break upon movement of the first wing.

In an embodiment, the present invention provides a method of affixing an old work box to a wall, the method comprising: providing the old work box, the old work box comprising a partition with a partition outer surface and a partition inner surface, at least one flange disposed on the partition, a first wing movably disposed on the partition, and a first runner connecting the first wing to the partition outer surface; and inserting the old work box into an opening in the wall then breaking the first runner, or breaking the first runner then inserting the old work box into an opening in the wall.

DETAILED DESCRIPTION

Figure 1:
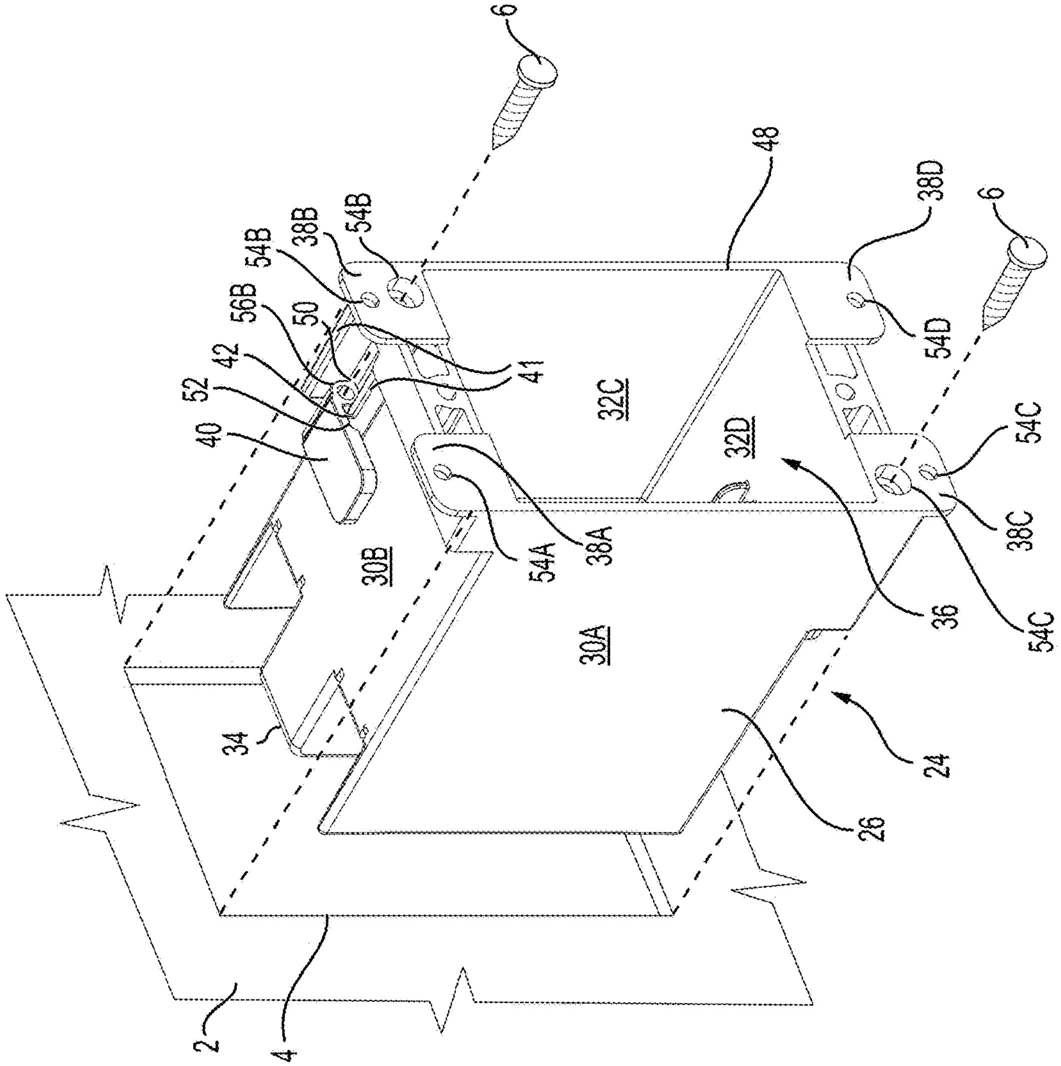
FIG. 1 shows an embodiment of an old work box according to the present disclosure in a front left perspective view and positioned adjacent an opening in a wall, with a wing of the old work box in a folded position.
Figure 2:
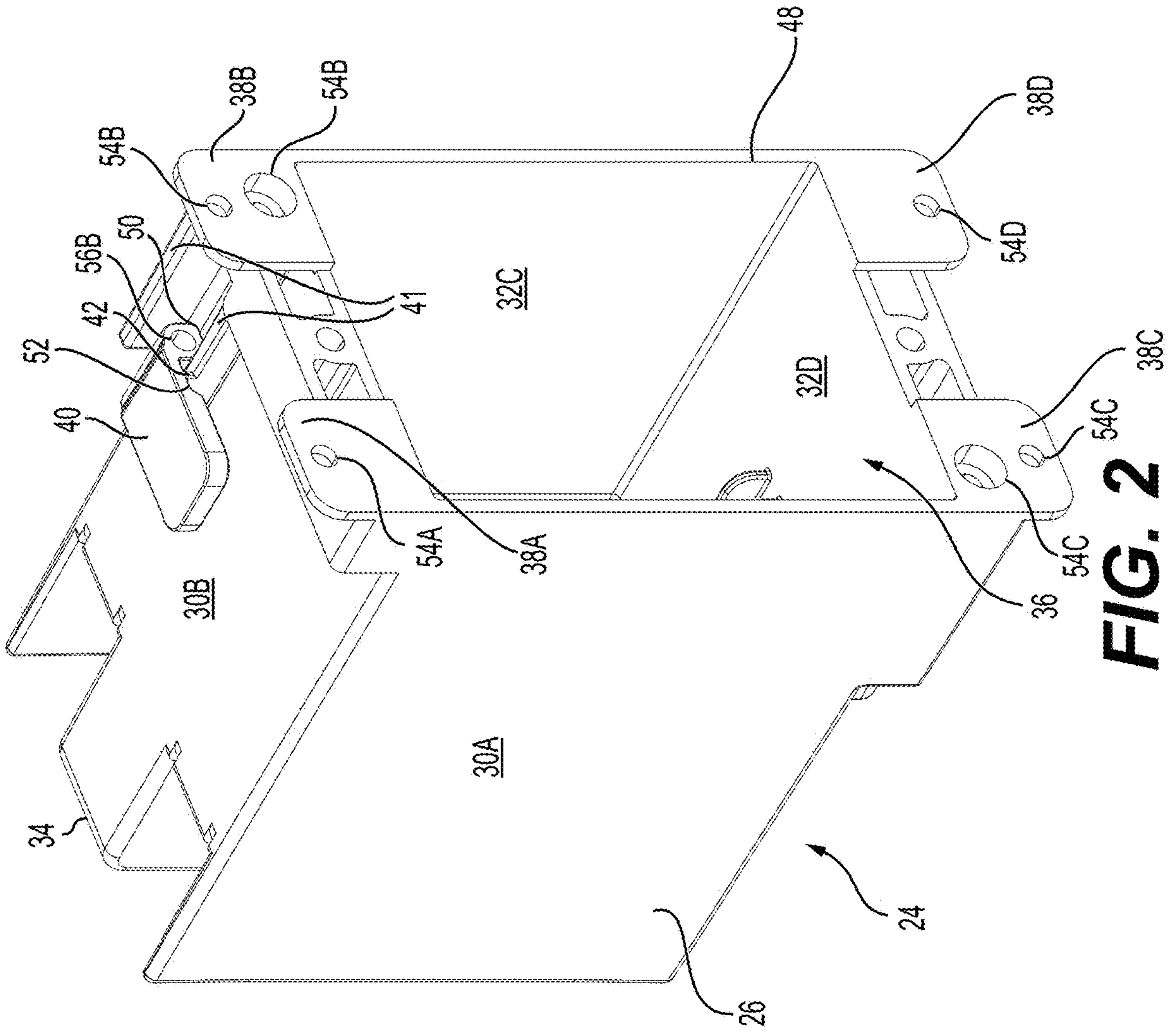
FIG. 2 shows the old work box of FIG. 1 in a front left perspective view.
Figure 3:
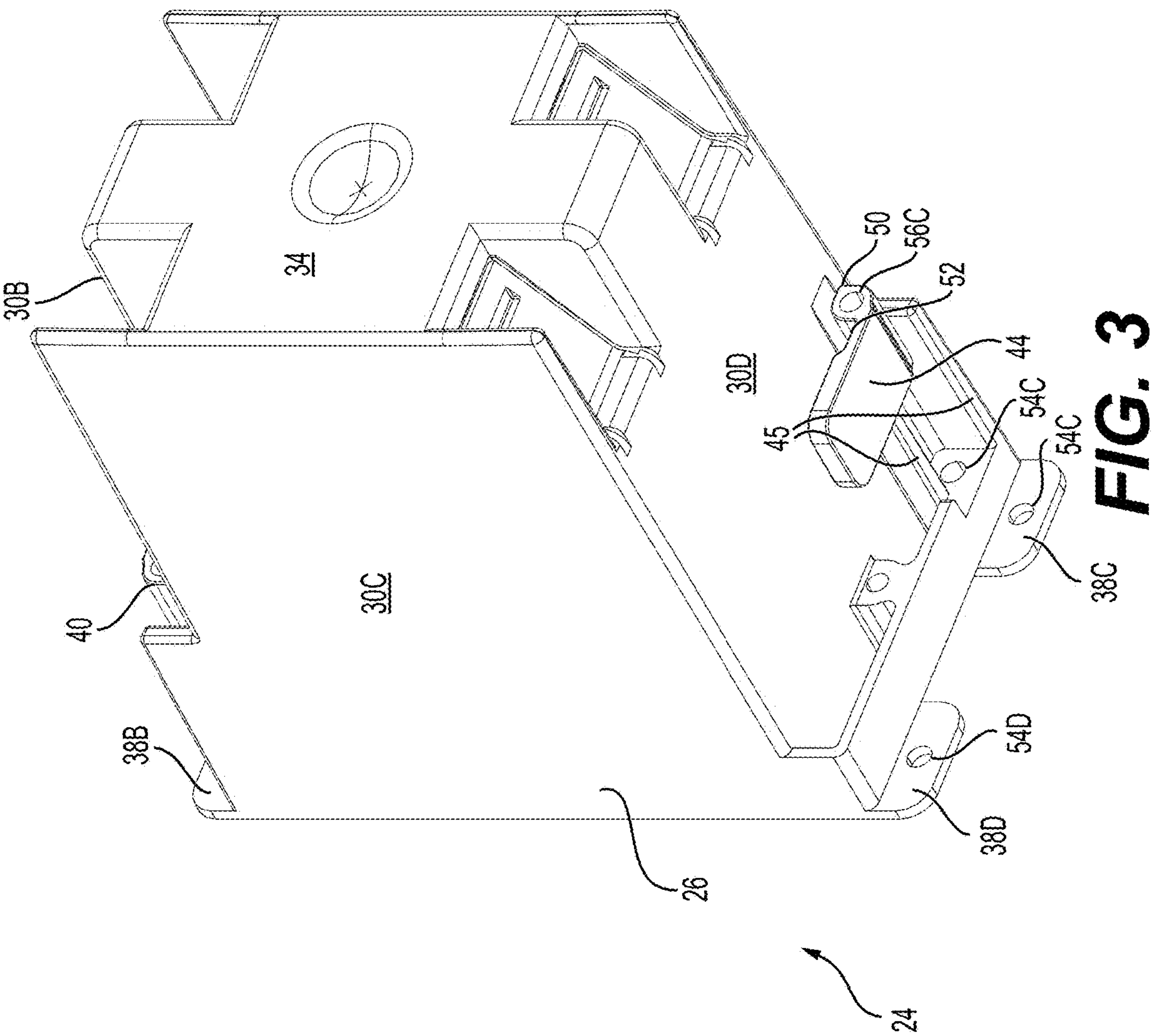
FIG. 3 shows the old work box of FIG. 1 in a rear right perspective view.
Figure 4:
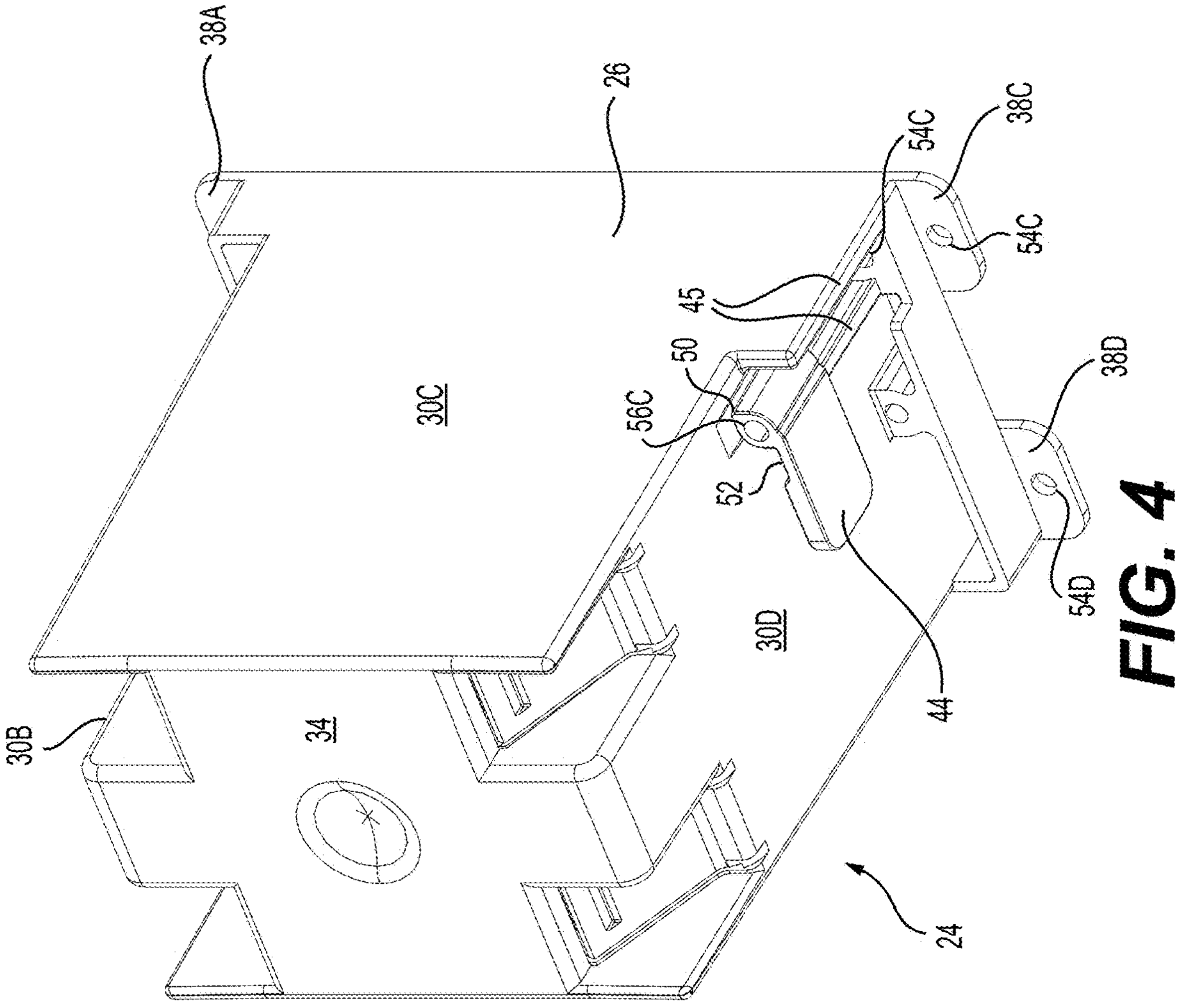
FIG. 4 shows the old work box of FIG. 1 in a rear left perspective view.
Figure 5:
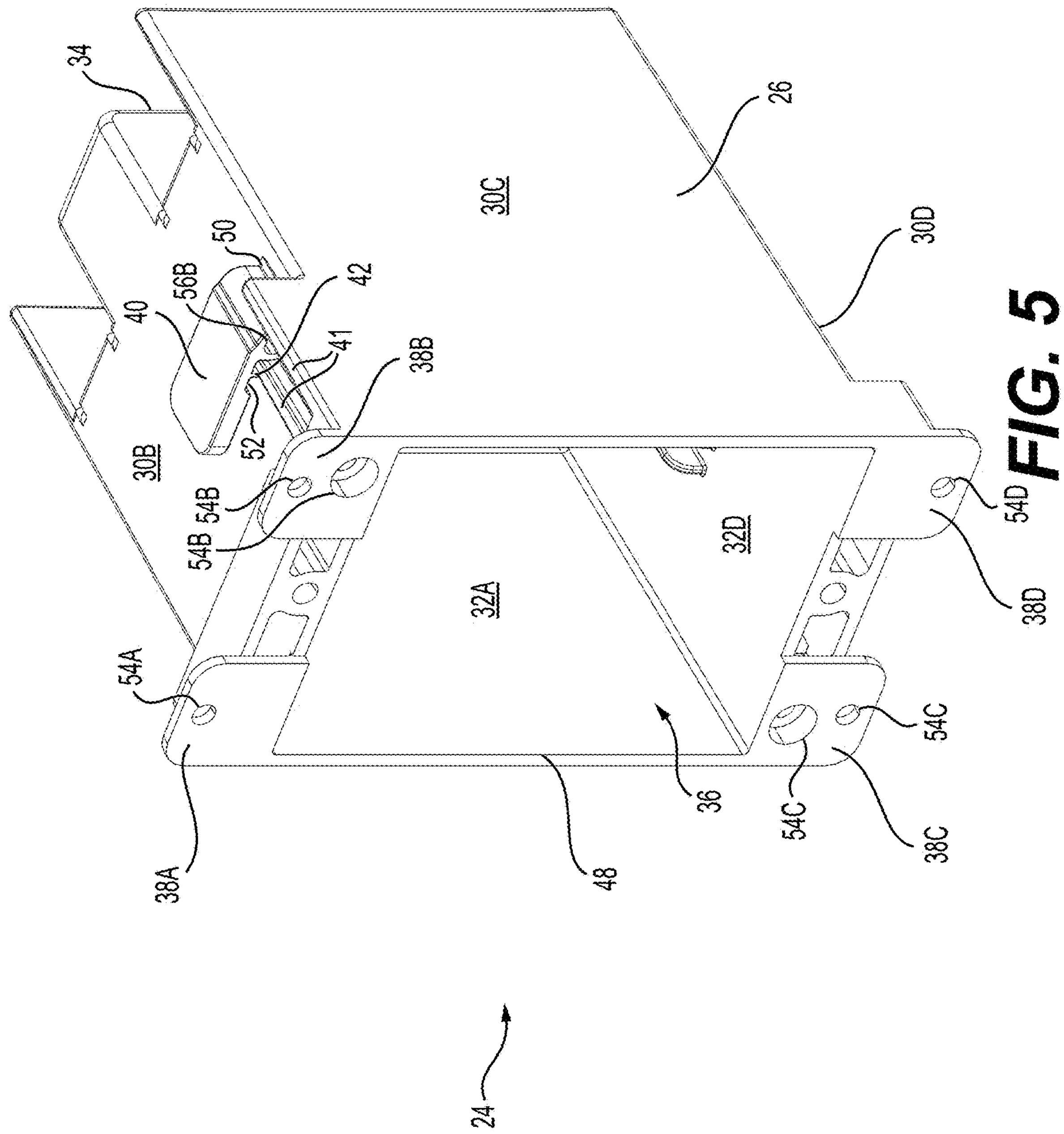
FIG. 5 shows the old work box of FIG. 1 in a front right perspective view.
Figure 6:
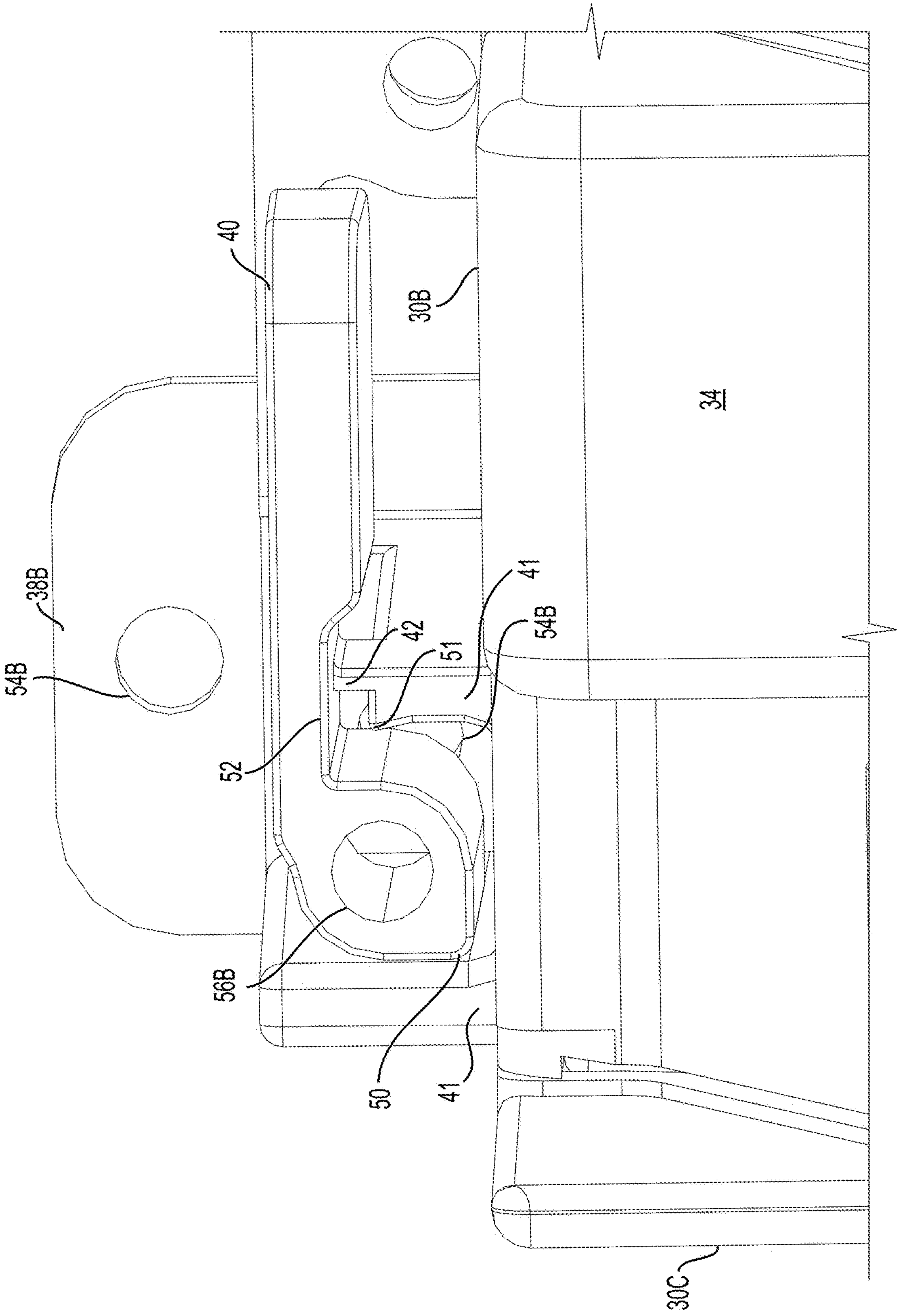
FIG. 6 shows a detail view of a wing of the old work box of FIG. 1 in a folded position.
Figure 7:
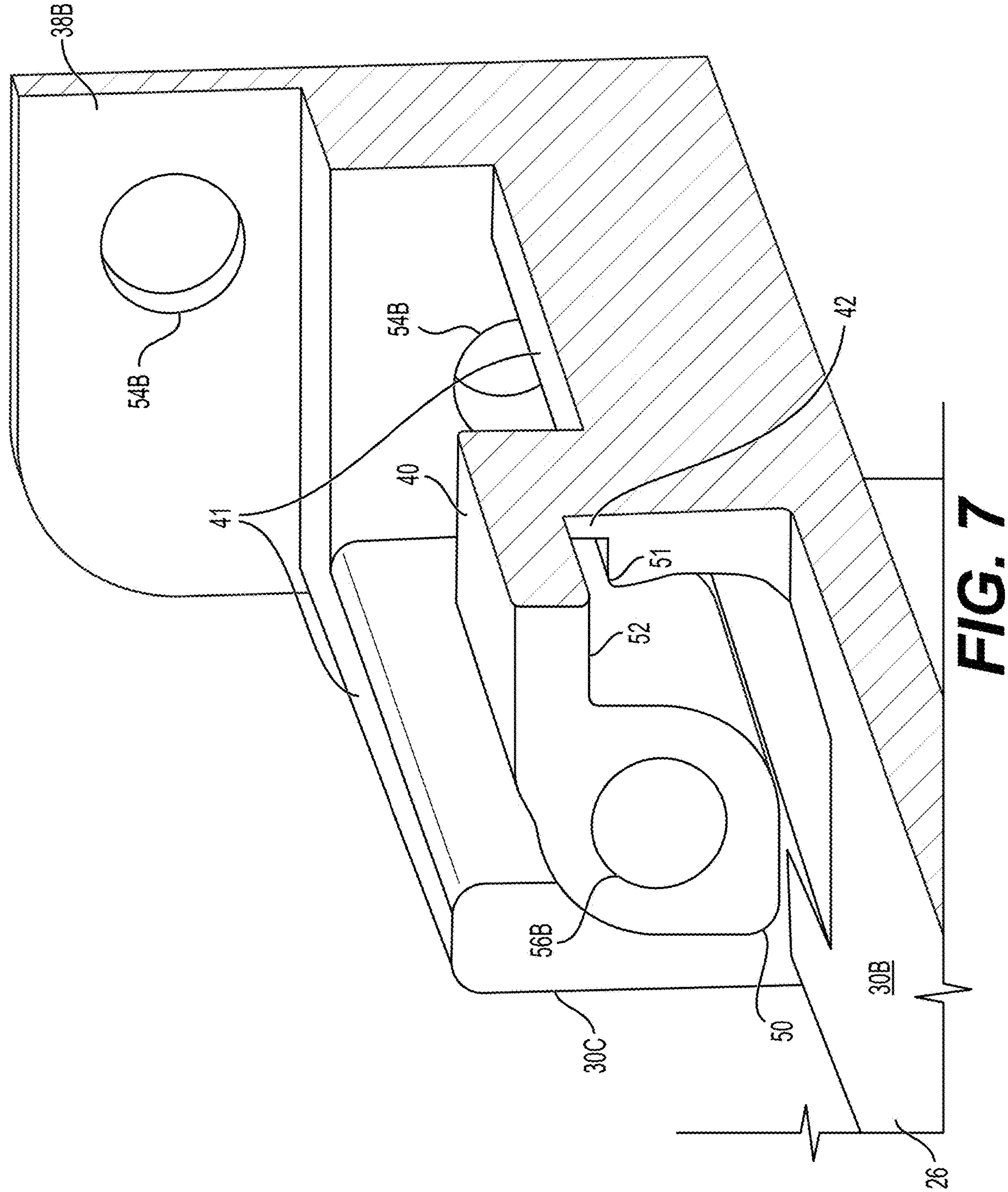
FIG. 7 shows a cutaway detail view of the wing of FIG. 6.
Figure 8:
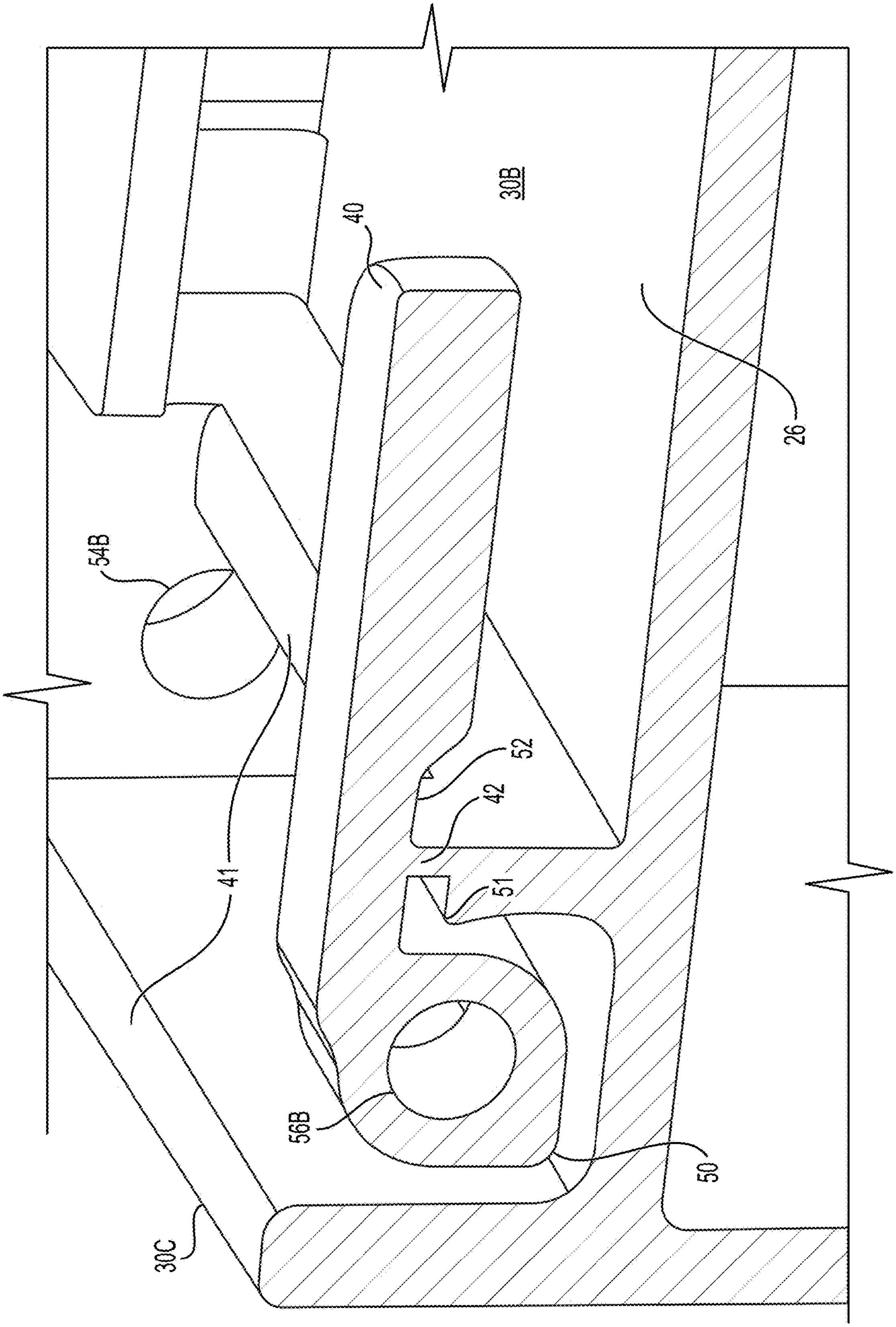
FIG. 8 shows another cutaway detail view of the wing of FIG. 6.

To overcome the problems associated with the prior art, the present application describes old work boxes and methods of affixing old work boxes to a wall (or a ceiling) that avoid the need to assemble distinct components of the old work box. In general, such old work boxes are non-metallic (e.g., plastic), so as to be capable of being injection molded in a molding process.

To avoid assembly challenges, the present disclosure contemplates the addition of molded-in wings to an old work box. In the context of the present disclosure, a runner is a component of the old work box that provides a pathway for a material of the old work box (e.g., plastic) to flow, during formation of the old work box (e.g., during a molding process), from one mold cavity for the old work box (e.g., a partition) into another mold cavity for the old work box (e.g., a wing). The existence of one or more runners therefore eliminates the need to separately form two distinct components, as a single component is formed instead.

The structure of an old work box according to the present disclosure will now be discussed in the context of FIGS. 1-16. More specifically, FIGS. 1-8 show one embodiment of an old work box according to the present disclosure, while FIGS. 9-16 show another embodiment of an old work box according to the present disclosure.

FIGS. 1-8 show an old work box 24 for installation in a wall 2, and specifically in an opening 4 of the wall 2. The old work box 24 comprises a partition 26, which generally has a partition outer surface 30 and partition inner surface 32. In an embodiment, the partition outer surface 30 can comprise multiple partition outer surface portions (e.g., partition outer surface portions 30A, 30B, 30C, 30D). Each of the partition outer surface portions 30A, 30B, 30C, 30D can combine to form the partition outer surface 30. Similarly, the partition inner surface 32 can comprise multiple partition inner surface portions (e.g., partition inner surface portions 32A, 32B. 32C, 32D). Each of the partition inner surface portions 32A, 32B, 32C, 32D can combine to form the partition inner surface 32.

Although the figures show four partition outer surface portions 30A, 30B, 30C, 30D and four partition inner surface portions 32A, 32B, 32C, 32D, there can be more or fewer partition outer surface portions and partition inner surface portions. In general, however, the total number of partition outer surface portions is equal to the total number of partition inner surface portions.

The old work box 24 also includes a backing wall 34 attached to the partition 26. The backing wall 34 and the partition 26 form a work box cavity 36. The work box cavity 36 forms a space for housing one or more electrical connections and/or components (e.g., a wire). Although component 34 is referred to as a backing wall, the term "backing" is not intended to be limiting in any way. More generally, the backing wall 34 is intended to close off one side of the partition 26 to help form the work box cavity 36, else the old work box 24 would not effectively house therein the one or more electrical connections and/or components.

At least one flange 38 is disposed on the partition 26. The at least on flange 38 can be disposed on the partition 26 in such a way that, when the old work box 24 is installed into the opening 4 in the wall 2, the at least one flange 38 lays on the outer surface of the wall 2, which facilitates affixing the old work box 24 to the wall 2. The at least one flange 38 can comprise multiple flanges. For example, as shown in the figures, the old work box 24 can include flanges 38A, 38B. 38C, 38D, each of which can be disposed at a different location on the partition 26. By arranging more than one flange 38 at more than one location on the partition 26, the old work box 24 is able to be more securely affixed to the wall 2 as compared to a partition 26 with a single flange 38.

A first wing 40 is movably disposed on the partition 26. The first wing 40 could be disposed, for example, on the partition outer surface 30, as shown in the figures. The first wing 40 is movably disposed in the sense that, to the extent not otherwise rendered immobile (e.g., by a first runner 42, as discussed further herein), it can be moved with respect to the partition 26. For example, the first wing 40 may be rotatable with respect to the partition 26. One way to accomplish such rotation is to have the first wing 40 is positioned within a first channel 41 on the partition outer surface 30. In this manner, the first wing 40 may have a loose tolerance ft with respect to the first channel 41 that allows the first wing 40 to rotate with respect to the first channel 41, and with respect to the partition 26. Such an arrangement also allows the first wing 40 to be translated along the first channel 41 without disengaging from the partition 26.

The old work box 24 also includes a first runner 42 connecting the first wing 40 to the partition outer surface 30. After formation (e.g., the molding process) of the old work box 24, the first runner 42 holds the first wing 40 in place with respect to the partition outer surface 30. The first runner 42 holds the first wing 40 in place with respect to the partition outer surface 30 because, as discussed herein, the first runner 42 provides a pathway for a material of the old work box 24 (e.g., plastic) to flow, during formation of the old work box 24 (e.g., during a molding process) from one mold cavity for the old work box 24 (e.g., the mold cavity for the partition 26) into another mold cavity for the old work box 24 (e.g., the mold cavity for the first wing 40). As such, formation of the old work box 24 results in a single piece that does not require assembly, rather than multiple discrete pieces that do require assembly.

The first runner 42 is configured to break upon movement of the first wing 40. More specifically, upon sufficient application of force to the first wing 40 (e.g., through rotation of a fastener 6 into a wing hole 56 of the first wing 40, as discussed in more detail herein), the first runner 42 will break, and no longer prevent the first wing 40 from moving with respect to the partition 26 and/or the partition outer surface 30. The first runner 42 can be broken in a number of different ways. For example, the first wing 40 could be rotated with respect to the partition outer surface 30 on which the first wing 40 is disposed. The first wing 40 could be translated with respect to the partition outer surface 30 on which the first wing 40 is disposed. Other types of movement are contemplated and within the scope of the present disclosure. At minimum, whatever form the movement takes, the movement of the first wing 40 must apply sufficient force to the first runner to break the first runner 42, ultimately allowing the first wing 40 to be movable with respect to the partition 26.

As discussed, a purpose of the first runner 42 is to provide a pathway for material (e.g., plastic) to flow into the first wing 40 during formation of the old work box 24. As such, the first runner 42 needs to be large enough to provide a pathway for adequate material flow to fill a mold cavity corresponding to the first wing 40, yet small enough to break upon application of sufficient force (e.g., through rotation or translation of the first wing 40). The shape of the first runner 42 can also be varied as appropriate, as long as it provides such a pathway.

In this manner, the first runner 42 can be positioned in a number of different orientations with respect to the first wing 40. One example of the placement of the first runner is shown in FIGS. 1-8, in which the first runner 42 is connected to the first wing 40 while the first wing 40 is in a folded position (i.e., the first wing 40 lays generally flat with respect to the partition outer surface 30 on which the first wing 40 is disposed). Another example of the placement of the first runner 42 is shown in FIGS. 9-16, in which the first runner 42 is connected to the first wing 40 while the first wing 40 is in an unfolded position (i.e., the first wing 40 is generally perpendicular with respect to the partition outer surface 30 on which the first wing 40 is disposed). In either case, however, the first runner 42 is large enough to provide a pathway for adequate material flow to fill a mold cavity corresponding to the first wing 40, yet small enough to break upon application of sufficient force. Other orientations of the first runner 42 with respect to the first wing 40 that meet these criteria are also possible and within the scope of the present application.

As discussed, the first wing 40 is movable between a folded position (i.e., as shown in FIGS. 1-8) and an unfolded position (i.e., as shown in FIGS. 9-16). Movement of the first wing between the folded position and the unfolded position facilitates insertion of the old work box 24 into the opening 4 in the wall 2. For example, when the first wing 40 is in the folded position, the first wing 40 lays generally flat with respect to the partition outer surface 30 on which the first wing 40 is disposed, allowing the old work box 24 as a whole to be more easily inserted into the opening 4. Moreover, upon insertion of the old work box 24 into the opening 4, the first wing 40 can be moved to the unfolded position as to allow fixation of the old work box 24 to the wall 2, as discussed in more detail herein.

Different configurations of the first runner 42 and the first wing 40 with respect to the partition outer surface 30 are possible. For example, the first runner 42 could connect the first wing 40 to the partition outer surface 30 while the first wing 40 is in the folded position, as shown in FIGS. 1-8. Alternatively, the first runner 42 could connect the first wing 40 to the partition outer surface 30 while the first wing 40 is in the unfolded position, as shown in FIGS. 9-16.

Figure 9:
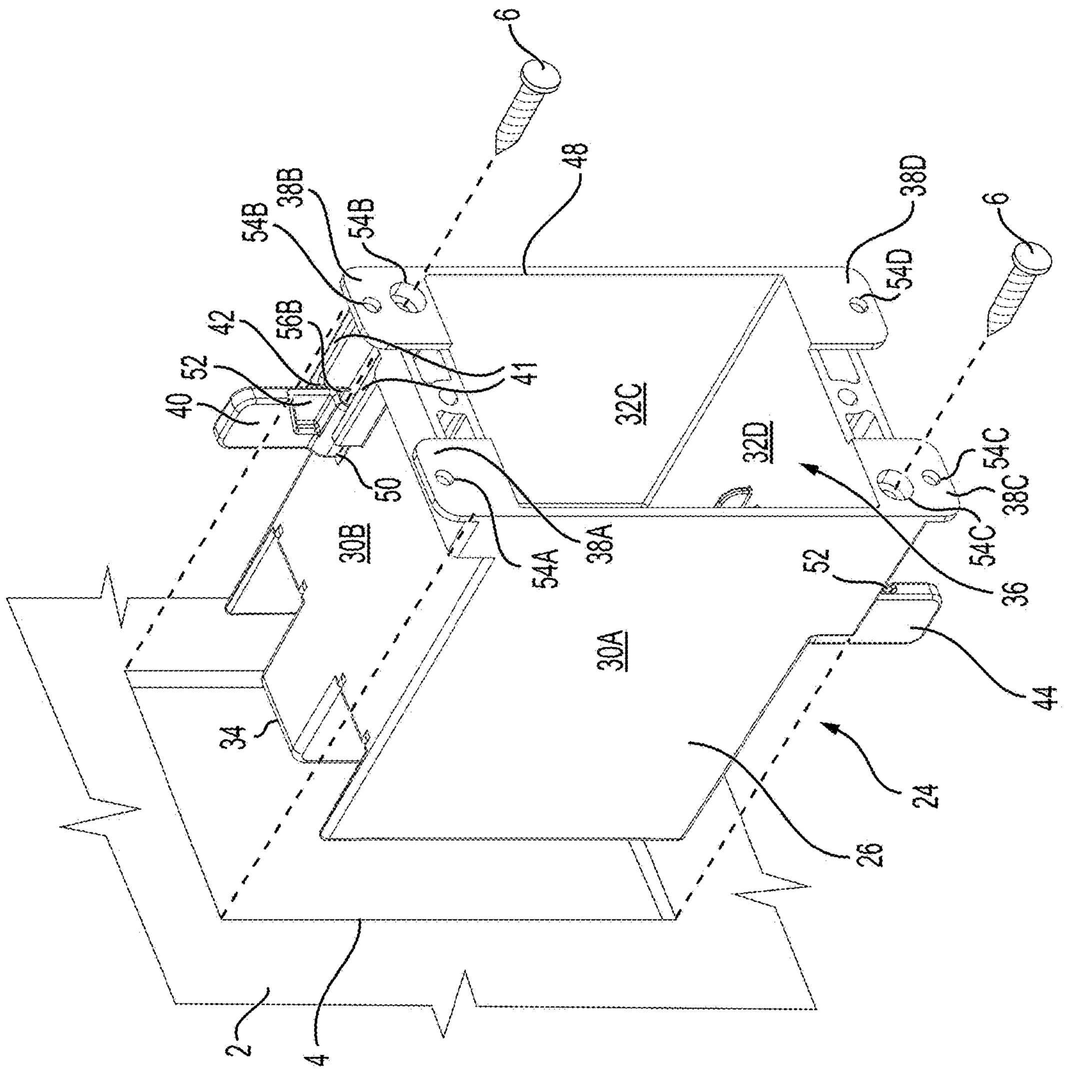
FIG. 9 shows another embodiment of an old work box according to the present disclosure in a front left perspective view and positioned adjacent an opening in a wall, with a wing of the old work box in an unfolded position.
Figure 10:
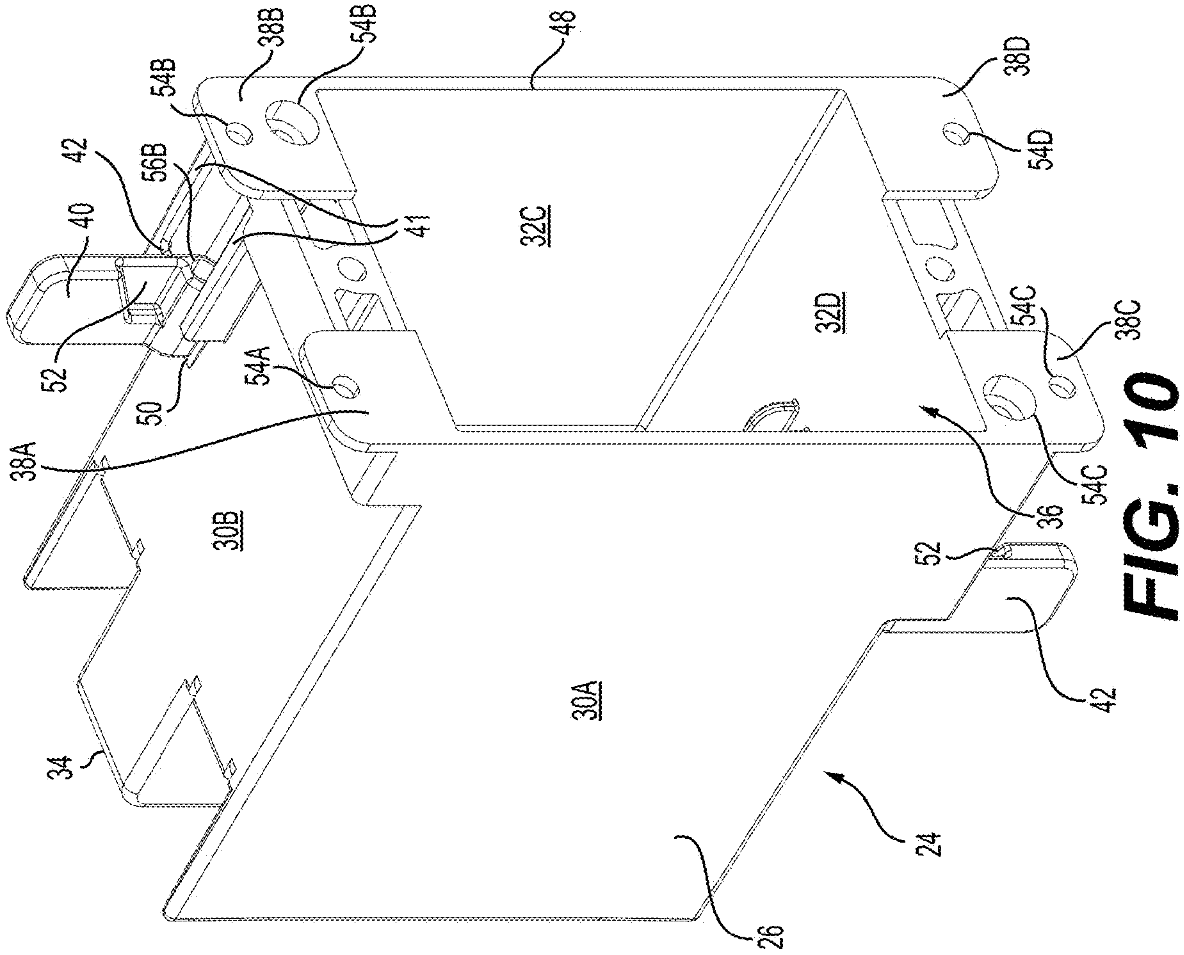
FIG. 10 shows the old work box of FIG. 9 in a front left perspective view.
Figure 11:
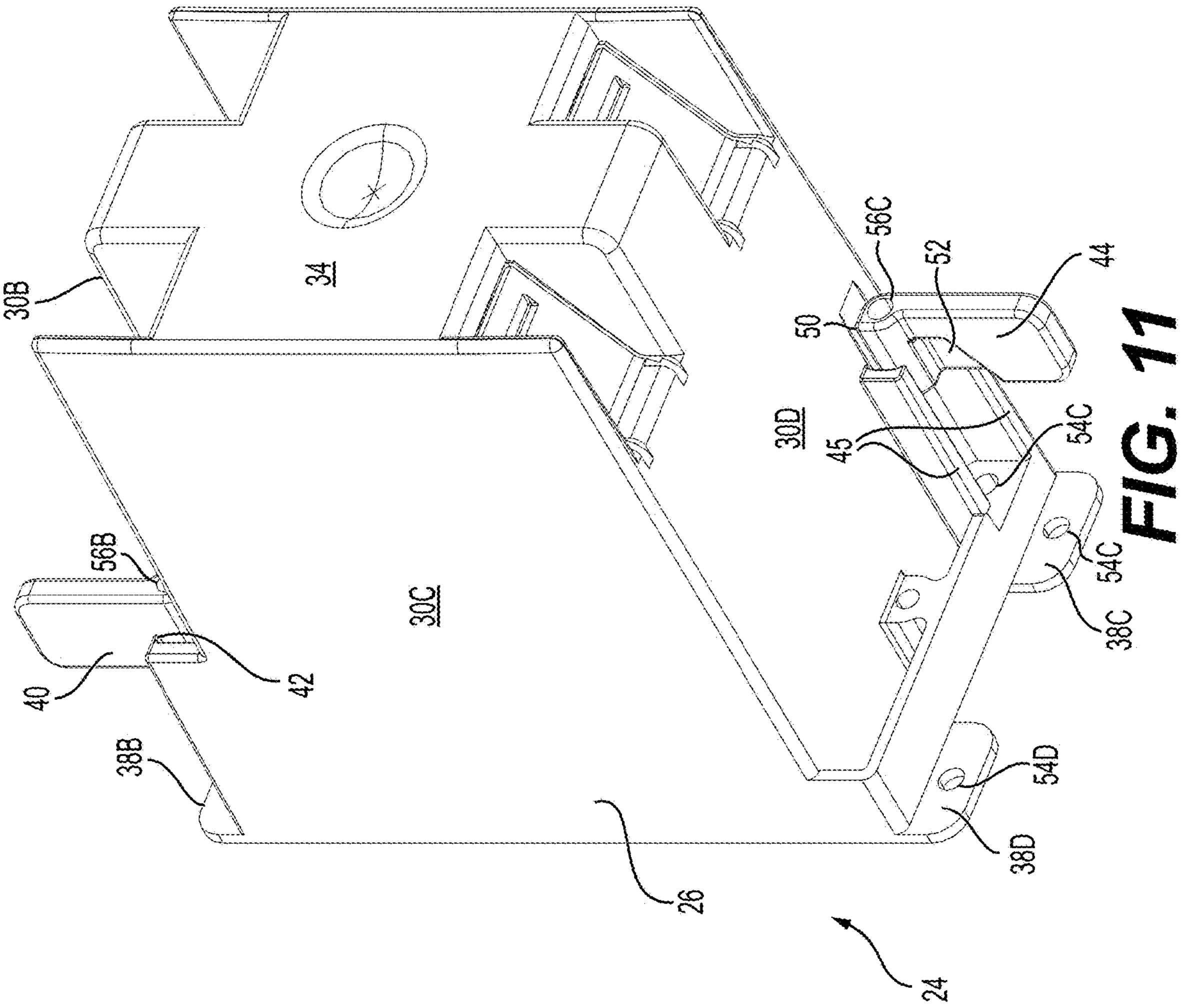
FIG. 11 shows the old work box of FIG. 9 in a rear right perspective view.
Figure 12:
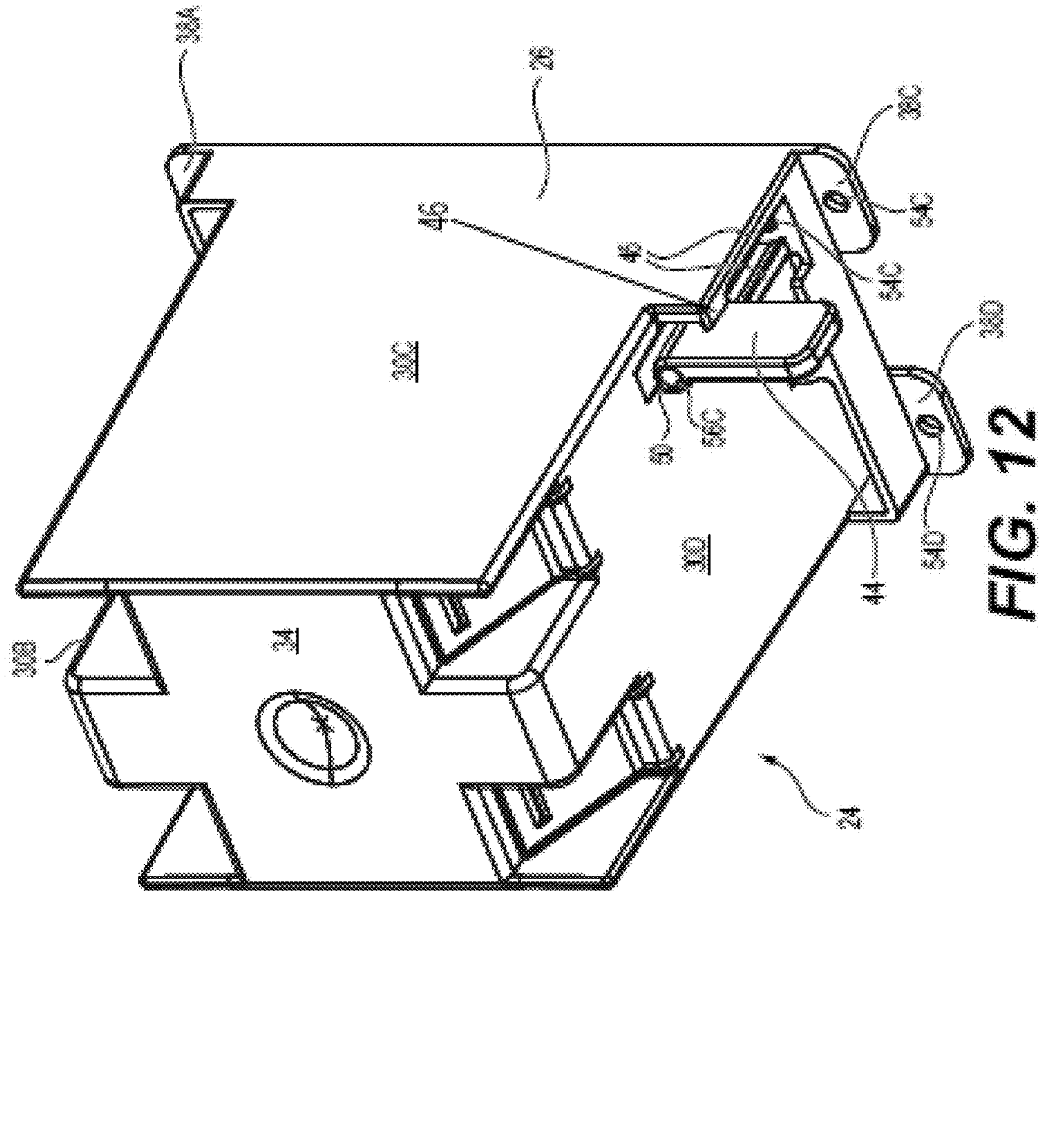
FIG. 12 shows the old work box of FIG. 9 in a rear left perspective view.
Figure 13:
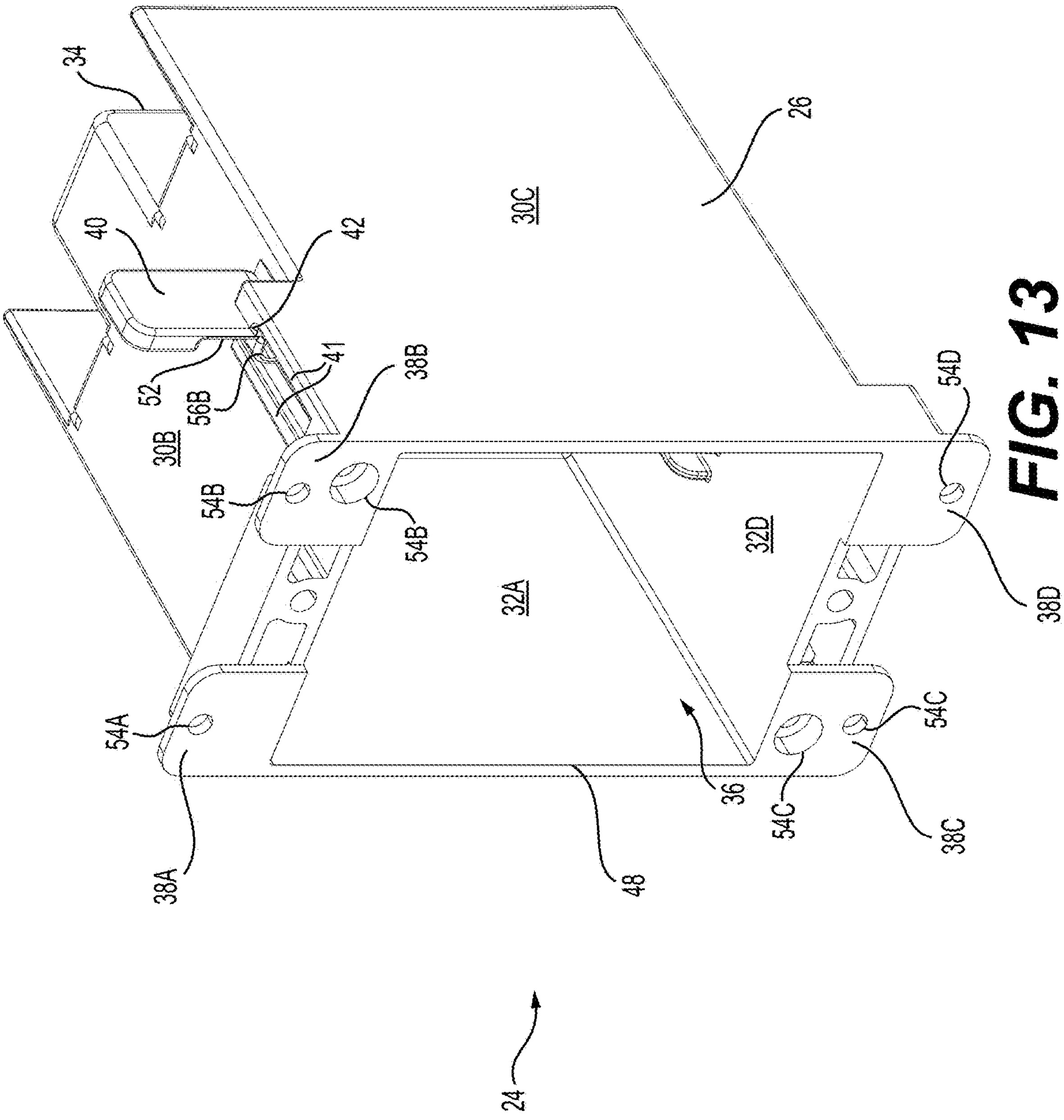
FIG. 13 shows the old work box of FIG. 9 in a front right perspective view.
Figure 14:
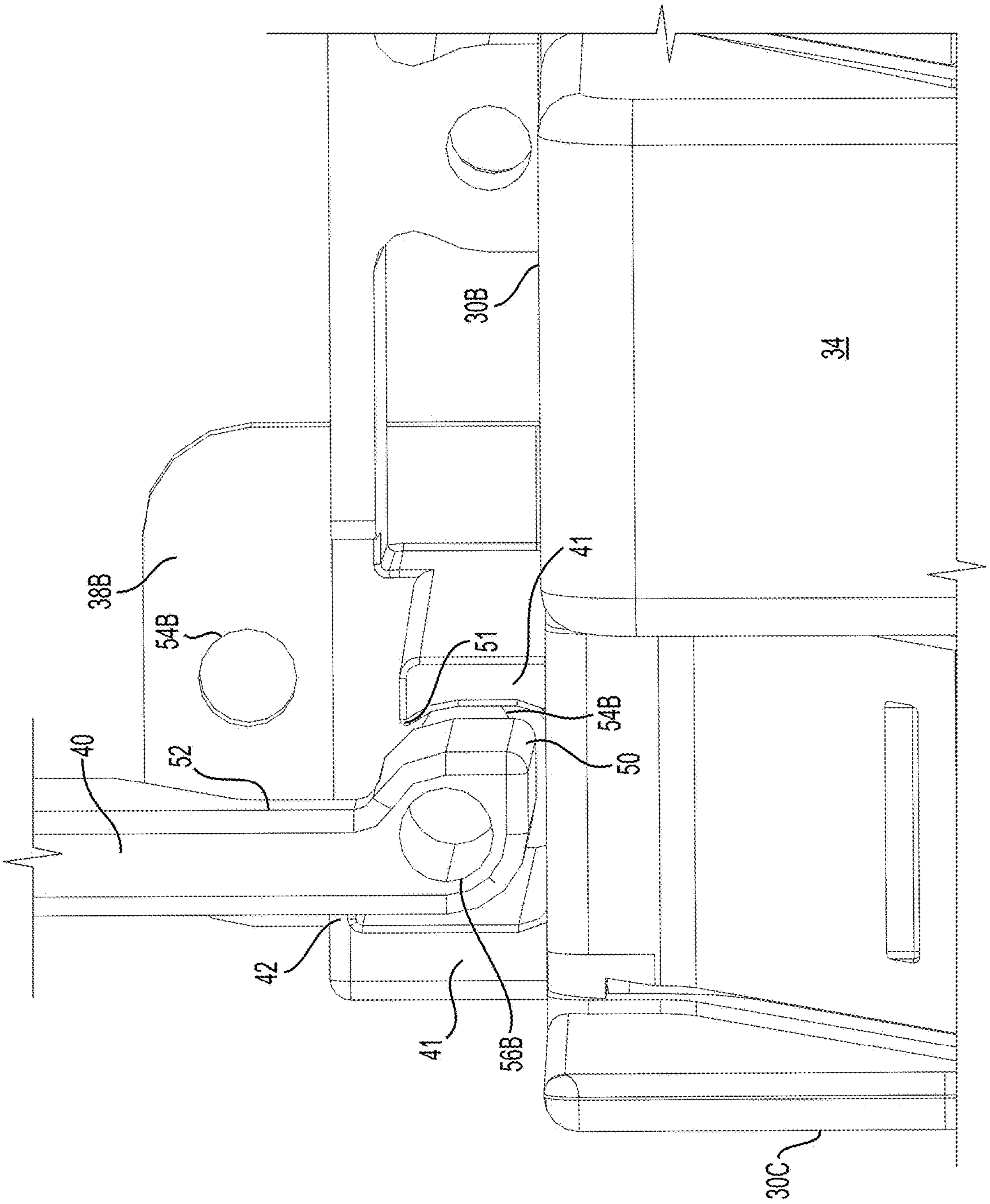
FIG. 14 shows a detail view of a wing of the old work box of FIG. 9 in an unfolded position.
Figure 15:
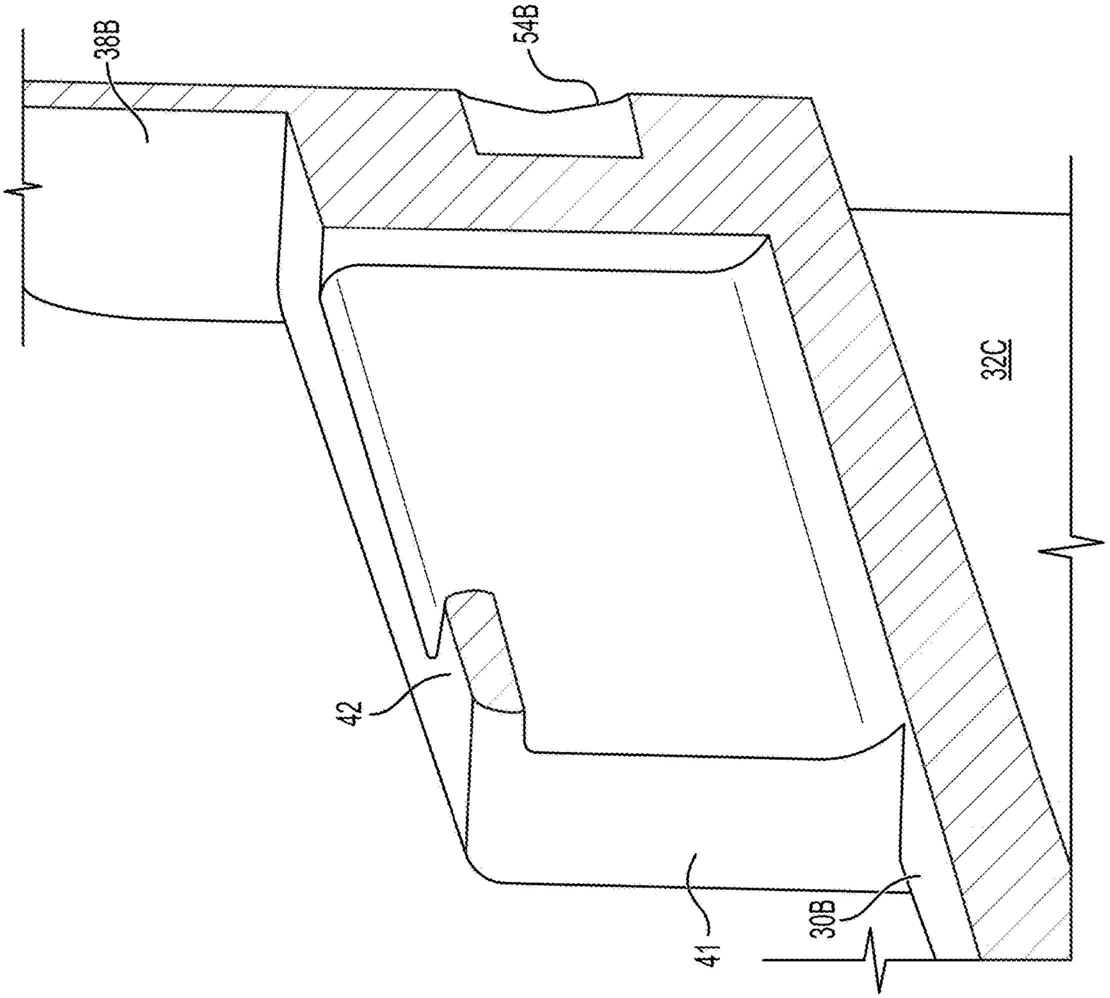
FIG. 15 shows a cutaway detail view of the old work box of FIG. 9.
Figure 16:
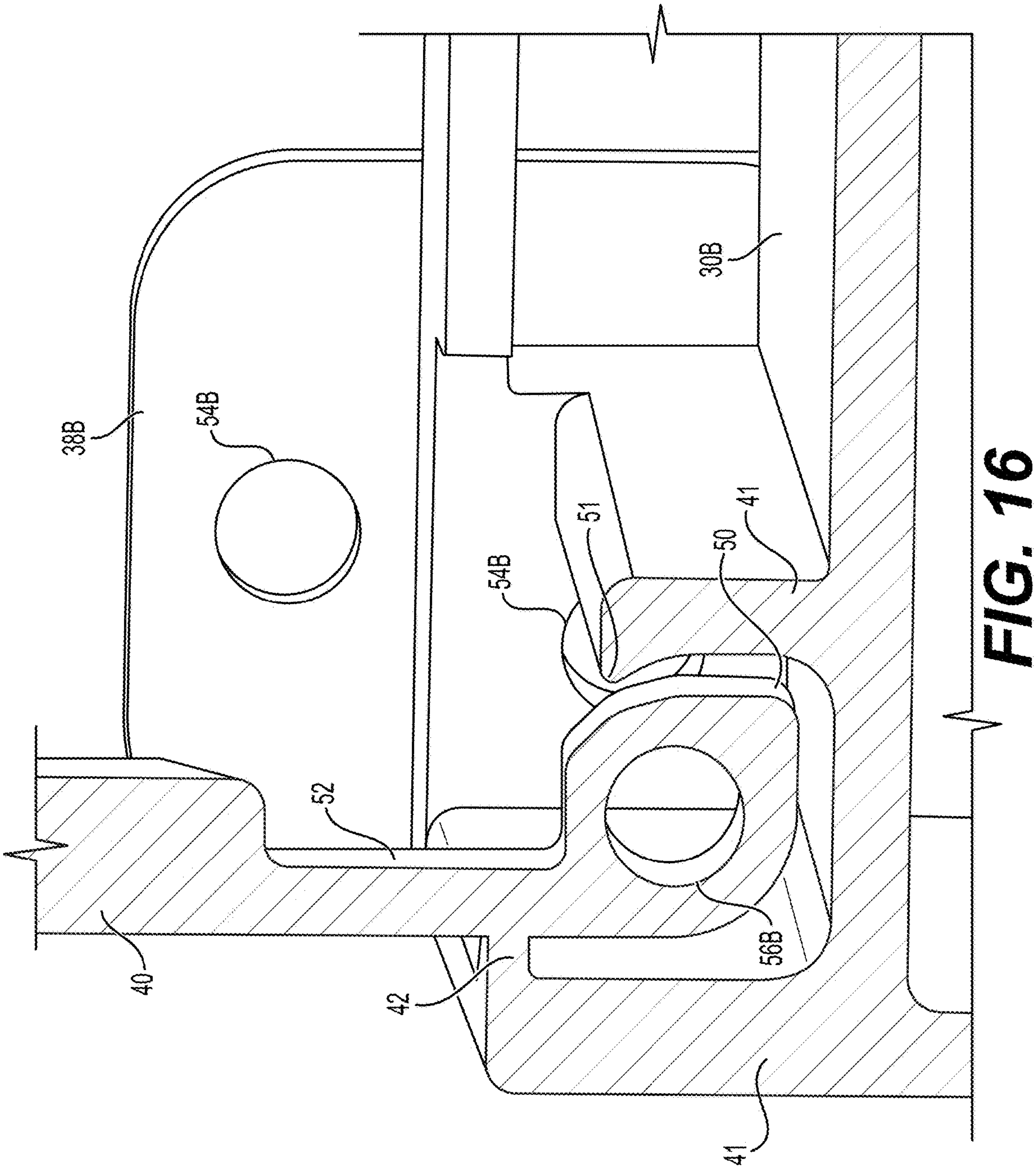
FIG. 16 shows a cutaway detail view of the wing of FIG. 14.

As discussed in further detail herein, movement of the first wing 40 to the unfolded position disposes the wall 2 between the first wing 40 and the at least one flange 38. More specifically, FIG. 9 shows a configuration in which the first wing 40 is in the unfolded position. Although the old work box 24 is shown in FIG. 9 as not yet having been inserted into the opening 4 in the wall 2, once the old work box 24 is inserted into the opening 4 and the first wing 40 is moved to the unfolded position, the wall 2, which has a finite thickness, would be disposed between the first wing 40 and flange 38B. Such an orientation allows the clamping of the wall 2 between the flange 38B and the first wing 40.

The old work box 24 may have more wings than the first wing 40. In an embodiment, the old work box 24 may include a second wing 44. In general, the discussion herein regarding the first wing 40 is equally applicable to the second wing 44, as well as any other wings included on the old work box 24. As but one example, the second wing 44 may also be movably disposed on the partition 26. For the sake of brevity, other similarities between the first wing 40 and the second wing 44 will not be repeated.

The old work box 24 may also include a second runner 46 that connects the second wing 44 to the partition outer surface 30. The second runner 44 may be configured to break upon movement of the second wing 44. In this regard, the discussion herein regarding the first runner 42 is equally applicable to the second runner 46. For the sake of brevity, other similarities between the first runner 42 and the second runner 46 will not be repeated.

In an embodiment, the at least one flange 38 may be disposed on the partition 26 opposite the backing wall 34. However, the at least one flange 38 may be disposed at other locations on the partition 26 with respect to the backing wall 34 or some other component of the old work box 24.

The work box cavity 36 has a work box cavity opening 48, as shown most clearly in FIGS. 1-2, 5, 9-10, and 13. The work box cavity opening 48 facilitates insertion of one or more electrical connections and/or components into the work box cavity 36, either before, during, or after the old work box 24 is affixed to the wall 2.

In an embodiment, at least one flange 38 may be disposed adjacent the work box cavity opening 48 so that the at least one flange 38 generally extends in a same plane as the work box cavity opening 48.

Turning to FIGS. 6-8 and 14-16, the first wing 40 and/or the second wing 44 may have one or more features to improve the functionality of the old work box 24. For example, the first wing 40 and/or the second wing 44 may include one or more edges 50 that limit the movement of the respective wing. In an embodiment, the edge 50 may limit movement (e.g., rotation) of a respective wing beyond the unfolded position, as movement of the respective wing may cause the edge 50 to come into contact with a rim 51. Other manners of limiting a movement of a wing are contemplated and within the scope of the present disclosure.

In an embodiment, the first wing 40 and/or the second wing 44 may have one or more cutouts 52 configured to facilitate the respective wing folding flat with respect to the partition outer surface 30 while the respective wing is in the folded position.

In view of the foregoing, a method of affixing the old work box 24 to the wall 2 can include providing an old work box 24 as shown and described herein. As shown most clearly in FIGS. 1 and 9, the method includes inserting the old work box 24 into the opening 4 in the wall 2, then breaking a runner associated with a wing (e.g., breaking first runner 42 associated with first wing 40). Alternatively, the method can include first breaking a runner associated with a wing (e.g., breaking first runner 42 associated with first wing 40), then inserting the old work box 24 into the opening 4 in the wall 2. In this manner, the present application contemplates more than one way to affix the old work box to the wall 2, given that the order of the steps of the method can change, yet the method still produces the same result.

In an embodiment, the method can include breaking the runner (e.g., first runner 42, second runner 46, etc.) by, for example, inserting a fastener 6 through a flange hole 54 in a flange 38, inserting the fastener 6 into a wing hole 56 in a respective wing (e.g., first wing 40, second wing 44, etc.), and rotating the fastener 6 so as to break the respective runner. In breaking the runner, the respective wing is movably disposed (e.g., rotatable) with respect the partition 26.

In an embodiment, the method can include moving the runner (e.g., first runner 42, second runner 46, etc.) to an unfolded position, as shown in FIGS. 9-16, so as to position the wall 2 between a flange 38 and the respective wing (e.g., first wing 40, second wing 44, etc.).

In an embodiment, the method can also include clamping the wall 2 between the flange 38 and the respective wing (e.g., first wing 40, second wing 44, etc.) by rotating the fastener 6 so as to reduce a distance between the respective wing (e.g., first wing 40, second wing 44, etc.) and the flange 38. Sufficiently reducing that distance ultimately results in the respective wing (e.g., first wing 40, second wing 44, etc.) contacting a back side of the wall 2, and the respective flange 38 contacting the front side of the wall 32, clamping the wall 2 therebetween, allowing the old work box 24 to be affixed to the wall 2.

In an embodiment, reducing the distance between the respective wing (e.g., first wing 40, second wing 44, etc.) and the flange 38 by rotating the fastener 6 includes translating the respective wing along a respective channel (e.g., first channel 41, second channel 45, etc.). In the context of the first wing 40 specifically, the first wing 40 is positioned within a first channel 41 on the partition outer surface 30. The first wing 40 may have a loose tolerance fit with respect to the first channel 41, allowing the first wing 40 to rotate with respect to the first channel 41 and with respect to the partition 26, while at the same time allowing the first wing 40 to translate along the first channel 41 (e.g., due to rotation of the fastener 6 within the wing hole 56B) without disengaging from the partition 26.

In general, the discussion herein regarding the first channel 41 is equally applicable to the second channel 45, as well as any other channels included on the old work box 24. For the sake of brevity, other similarities between the first channel 41 and the second channel 45 will not be repeated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

2 Wall
4 Opening
6 Fastener
24 Old work box
26 Partition
30, 30A, 30B, 30C, 30D Partition outer surface
32, 32A, 32B, 32C, 32D Partition inner surface
34 Backing wall
36 Work box cavity
38, 38A, 38B, 38C, 38D Flange
40 First wing
41 First channel
42 First runner
44 Second wing
45 Second channel
46 Second runner
48 Work box cavity opening
50 Edge
51 Rim
52 Cutout
54, 54A, 54B, 54C, 54D Flange hole
56, 56B, 56C Wing hole

What is claimed is:

1. An old work box for installation in a wall, comprising:
a partition having a partition outer surface and a partition inner surface;
a backing wall attached to the partition, the backing wall and the partition forming a work box cavity;
at least one flange disposed on the partition;
a first wing having a hub rotatably disposed in a first channel, the first wing including a wing portion connected to the hub and extending radially therefrom, the hub being movably disposed on the partition within the first channel on the partition outer surface; and
a first runner disposed at an offset radial distance from the hub and connecting the wing portion of the first wing with the partition outer surface, the first runner being configured to break upon rotation of the first wing relative to the partition outer surface.

2. The old work box of claim 1, wherein the first wing is movable between a folded position and an unfolded position.

3. The old work box of claim 2, wherein the first runner connects the first wing to the partition outer surface while the first wing is in the folded position.

4. The old work box of claim 2, wherein the first runner connects the first wing to the partition outer surface while the first wing is in the unfolded position.

5. The old work box of claim 2, wherein movement of the first wing from the folded position to the unfolded position is configured to dispose the wall between the first wing and the at least one flange.

6. The old work box of claim 1, further comprising:
a second wing movably disposed on the partition; and
a second runner connecting the second wing to the partition outer surface, the second runner being configured to break upon movement of the second wing.

7. The old work box of claim 6, wherein the second wing is movable between a folded position and an unfolded position.

8. The old work box of claim 7, wherein the second runner connects the second wing to the partition outer surface while the second wing is in the folded position.

9. The old work box of claim 7, wherein the second runner connects the second wing to the partition outer surface while the second wing is in the unfolded position.

10. The old work box of claim 7, wherein the second runner is configured to break upon the movement of the second wing from the folded position.

11. The old work box of claim 1, wherein the first runner is configured to provide a first pathway for a material to flow into the first wing during a molding process of the old work box.

12. The old work box of claim 6, wherein the second runner is configured to provide a second pathway for a material to flow into the second wing during a molding process of the old work box.

13. The old work box of claim 1, wherein the at least one flange is disposed on the partition opposite the backing wall.

14. The old work box of claim 1, wherein the work box cavity has a work box cavity opening, and
wherein the at least one flange is disposed adjacent the work box cavity opening so that the at least one flange generally extends in a same plane as the work box cavity opening.

15. The old work box of claim 1, wherein the first wing comprises an edge configured to limit the movement of the first wing.

16. The old work box of claim 1, wherein the first wing comprises a cutout configured to allow the first wing to fold flat with respect to the partition outer surface while the first wing is in the folded position.

* * * * *